United States Patent
Hyndman et al.

(10) Patent No.: US 8,542,232 B2
(45) Date of Patent: Sep. 24, 2013

(54) METHOD AND APPARATUS FOR MONITORING USER ATTENTION WITH A COMPUTER-GENERATED VIRTUAL ENVIRONMENT

(75) Inventors: Arn Hyndman, Ottawa (CA); Nicholas Sauriol, Ottawa (CA)

(73) Assignee: Avaya Inc., Basking Ridge, NJ (US)

( * ) Notice: Subject to any disclaimer, the term of this patent is extended or adjusted under 35 U.S.C. 154(b) by 739 days.

(21) Appl. No.: 12/344,522

(22) Filed: Dec. 28, 2008

(65) Prior Publication Data

US 2010/0164956 A1   Jul. 1, 2010

(51) Int. Cl.
*G06T 15/20* (2011.01)
*G06T 15/00* (2011.01)
*G06T 17/00* (2006.01)

(52) U.S. Cl.
USPC .......................... 345/427; 345/419; 345/420

(58) Field of Classification Search
USPC .................................. 345/427, 419
See application file for complete search history.

(56) References Cited

U.S. PATENT DOCUMENTS

| | | | |
|---|---|---|---|
| 6,106,119 A | | 8/2000 | Edwards |
| 7,143,358 B1 * | | 11/2006 | Yuen .............................. 715/757 |
| 7,155,680 B2 * | | 12/2006 | Akazawa et al. ............. 715/757 |
| 2007/0061204 A1 | | 3/2007 | Ellis et al. |
| 2008/0108432 A1 | | 5/2008 | Cohen et al. |
| 2008/0158222 A1 * | | 7/2008 | Li et al. ......................... 345/418 |
| 2008/0204450 A1 * | | 8/2008 | Dawson et al. ............... 345/419 |
| 2008/0208685 A1 * | | 8/2008 | Hamilton et al. ............... 705/14 |
| 2009/0147003 A1 * | | 6/2009 | Do et al. ........................ 345/427 |
| 2010/0079446 A1 * | | 4/2010 | Betzler et al. ................. 345/419 |
| 2010/0145790 A1 * | | 6/2010 | Brignull et al. ............ 705/14.41 |
| 2010/0156899 A1 * | | 6/2010 | Bolger et al. ................. 345/420 |
| 2011/0113383 A1 * | | 5/2011 | Dyack et al. .................. 715/850 |

FOREIGN PATENT DOCUMENTS

| WO | WO 2006/110472 | 10/2006 |
|---|---|---|
| WO | WO 2008/065655 | 6/2008 |

OTHER PUBLICATIONS

Written Opinion of the International Searching Authority from corresponding PCT application PCT/CA2009/000384.

* cited by examiner

*Primary Examiner* — Kee M Tung
*Assistant Examiner* — Leon T Cain, II
(74) *Attorney, Agent, or Firm* — Anderson Gorecki & Rouille LLP

(57) ABSTRACT

Avatars focal points are monitored as the Avatars move within a virtual environment to determine, statistically, where users are looking at in the virtual environment. The Avatar's focal point may be used to control a virtual brush that may paint the virtual environment in an attention monitoring function. A statistical distribution about the focal point is used to affect the coloration, and other known information about the virtual environment may be used to affect the statistics. As attention records from multiple users are collected, they may be overlaid to obtain a very accurate picture of how users are interacting with the virtual environment and with objects in the virtual environment. The attention monitoring function may generate a thermal overlay to the virtual environment to visually show where users tend to focus within the virtual environment. Users' attention on three dimensional and graphic objects may be monitored as well.

15 Claims, 8 Drawing Sheets

METHOD AND APPARATUS FOR MONITORING USER ATTENTION WITH A COMPUTER-GENERATED VIRTUAL ENVIRONMENT

CROSS-REFERENCE TO RELATED APPLICATIONS

None

BACKGROUND OF THE INVENTION

1. Field of the Invention

The present invention relates to object and virtual environment design and, more particularly, to a method and apparatus for evaluating user perception in a 3D virtual environment.

2. Description of the Related Art

Advertising is ubiquitous. Typically, when a company wants to advertise their product they will either create their own advertising campaign, or hire an advertising agency to create an ad campaign. The advertising agency will generate an advertisement and, if the advertisement is approved by the company, may coordinate placement of the advertisement in the relevant media. Many types of advertising have been created over the years, including: print advertising (newspapers, magazines, brochures, and fliers); broadcast advertising (television radio and the Internet); outdoor advertising (billboards, kiosks, tradeshows and events); and covert advertising (product placement in movies and television shows). Other types of advertising, and variations of these types of advertising, may also exist or be developed over time.

Before spending large sums of money finalizing an advertisement and placing the advertisement into circulation, it may be advantageous to test the advertisement to determine its effectiveness. Particular advertisements may resonate well with particular demographics, while other advertisements may be found to be ineffective or, even worse, offensive to particular demographics. Accordingly, it is common to try to measure the effectiveness of a particular advertisement to see how the advertisement is perceived by particular groups of people. For example, the advertiser may want to know the overall impression of the advertisement, as well as more focused information such as what message the person is taking away from the advertisement, what aspect of the advertisement is being noticed by the person, whether the person is confused by the advertisement, what is attracting their attention most, and many other aspects of the advertisement.

Similar concerns may be encountered in other areas as well. For example, when a new product is to be introduced, such as a new piece of software, user interface, or web site, it may be desirable to test the usability of the product to see how it is perceived by prospective users. If a physical product is to be launched, the design of the product may be tested to determine target consumer's perception of the product design.

Unfortunately, obtaining genuine user feedback on an advertisement or product is not trivial. Many ways of attempting to track and understanding how a potential customer reacts to an ad, packaging, or new product or user interface, have been developed over the years. Unfortunately, each of the methodologies has certain drawbacks.

For example, one way to obtain user feedback is to use a focus group. A focus group is a group of people that are assembled to review the new advertisement/product and provide their feedback to the person running the focus group. Generally, a focus group is run by showing the members of the focus group a particular advertisement and then asking them for feedback about their impression of the particular advertisement. Similar methodology is used to test products, user interfaces, web site designs, etc. One problem with the use of focus groups is that the users/customers may not necessarily understand their own reactions to the advertisement/product. Accordingly, they may not be able to give accurate feedback to the person running the focus group. Additionally, the members of the focus group may modify their responses in order to gain the approval of the person running the test, or to respond in a way they think is proper and/or that will impress others in some way. This too may skew the results from the focus group.

Another way to attempt to obtain feedback is to videotape (and otherwise observe) a select group of test subjects as they are presented with the advertisement/product for the first time. This technique can be more effective than focus groups, as it isn't colored by the users' own perceptions of how they perceived something. However, it can be an expensive way of testing since the test subjects must be observed and their reactions painstakingly recorded and then analyzed. Also, it may be hard to get a statistically significant selection of the user/customer base. Finally, the test environment is typically different from the environment where the advertisement/product will be viewed and/or used, which may color the responses obtained using this method. For example, if the person being observed is aware that they are being observed, they may not act in a normal manner thus rendering the results less than perfect.

Another way to obtain feedback is to use physical sensors, such as eye tracking technology and physiological response sensors. This technique is more precise than the videotape/observing method, and can give some very subtle insight into the subconscious of the test subject. However, it requires expensive test equipment which makes it less desirable from an economic standpoint. Additionally, as with the videotaping/observing method, the test environment is typically different from that where the advertisement/product will be viewed and used, which may color the responses obtained using this method.

There are also indirect ways of determining the effectiveness of an advertisement or product. Typically, these indirect ways occur after the advertisement/product has been released and, hence, are too late in the development cycle to affect the advertisement/product. For example, changes in user purchasing behavior may be attributed to positive or negative attitudes toward the advertisement or the changed product. These indirect measurements may be used as rough feedback as an indication that people generally like the advertisement or do not like the advertisement. However, since there are many possible factors that may affect overall sales, this type of feedback is generally of lesser value than some of the other methods discussed above.

As noted, there are many ways of determining how an advertisement is or will be perceived by the relevant purchasing public. However, because of the limitations associated with these methods, and the costs involved in implementing some of the more accurate methods, it would be advantageous to provide another way to obtain user feedback.

Product design is similar to advertising, in that the design of the product, if done well, may capture users' attentions and help to sell the product. Determining which features of a product are appealing, however, encounters many of the same difficulties as advertising. Additionally, product design is extremely important because, once the design is finalized and manufacturing has begun, making changes to the product design may be very costly.

SUMMARY OF THE INVENTION

As Avatars move within the virtual environment, the place where the Avatar is looking is tracked to determine where users of the virtual environment are likely to be looking. The Avatar's focal point may be used to control a virtual brush related to a statistical distribution about the focal point. This brush is used to color the virtual environment in an attention monitoring system to statistically show what the user was likely to be looking at within the virtual environment. As attention records from multiple users are collected, they may be overlaid to obtain a very accurate picture of how users are interacting with the virtual environment and with objects in the virtual environment. The attention monitoring system may use the records from multiple users to form a thermal overlay to the virtual environment and objects within the virtual environment to show which aspects of the virtual environment are attracting the most attention. The thermal overlay may be mapped to the surfaces of the virtual environment so that the thermal overlay may be viewed by navigating through the virtual environment. The attention monitoring system may be used with objects in the virtual environment, both graphical and three dimensional, to determine how users interact with the objects.

BRIEF DESCRIPTION OF THE DRAWINGS

Aspects of the present invention are pointed out with particularity in the appended claims. The present invention is illustrated by way of example in the following drawings in which like references indicate similar elements. The following drawings disclose various embodiments of the present invention for purposes of illustration only and are not intended to limit the scope of the invention. For purposes of clarity, not every component may be labeled in every figure. In the figures:

DETAILED DESCRIPTION

Figure 1:
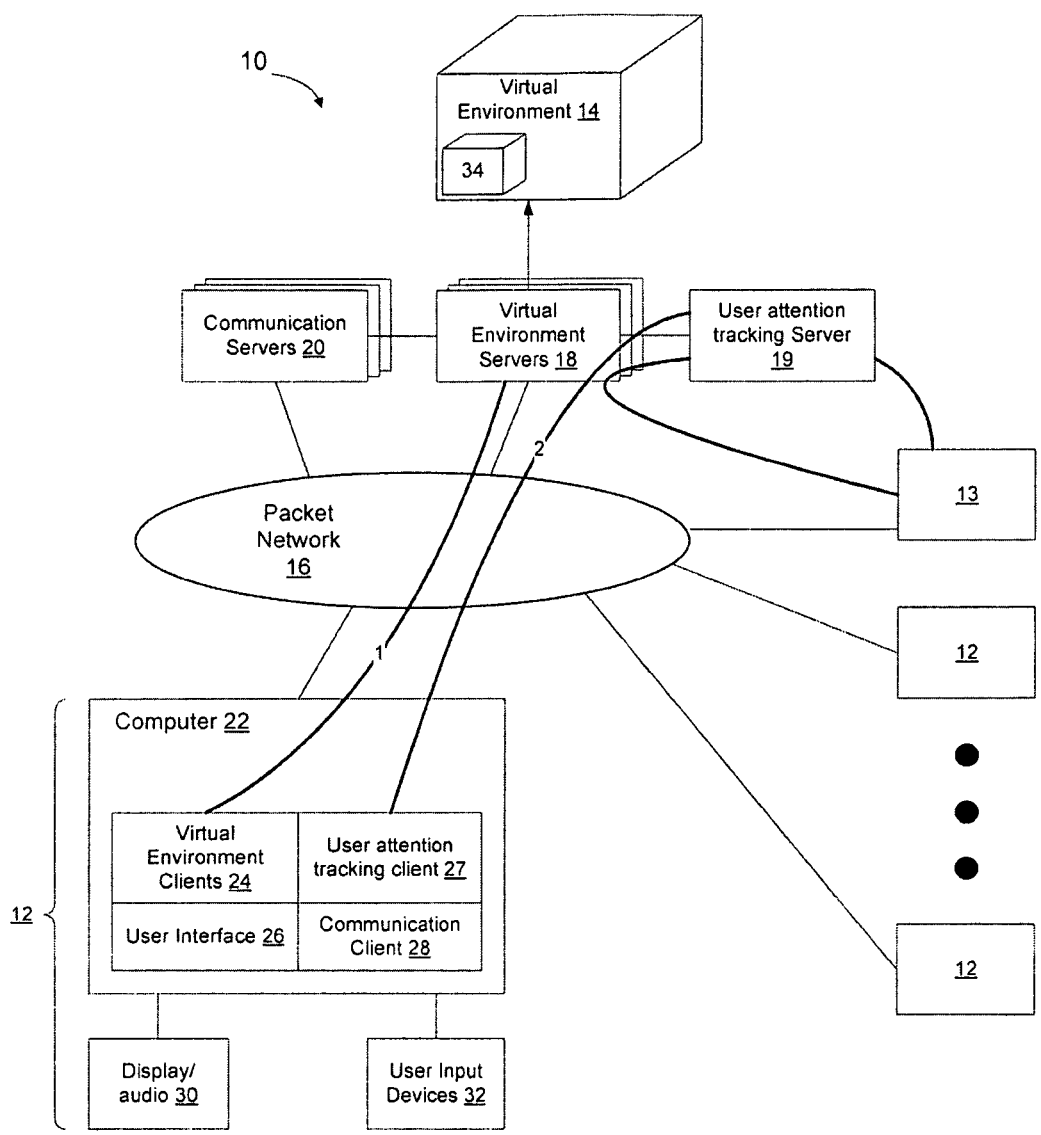
FIG. 1 is a functional block diagram of a portion of an example system for enabling user attention to be monitored with a computer generated virtual environment according to an embodiment of the invention.

The following detailed description sets forth numerous specific details to provide a thorough understanding of the invention. However, those skilled in the art will appreciate that the invention may be practiced without these specific details. In other instances, well-known methods, procedures, components, protocols, algorithms, and circuits have not been described in detail so as not to obscure the invention.

Virtual environments simulate actual or fantasy 3-D environments, and allow for many participants to interact with each other and with constructs in the environment via remotely-located clients. In a virtual environment, an actual or fantasy universe is simulated within a computer processor/memory. Multiple people may participate in the virtual environment through a computer network, such as a local area network or a wide area network such as the Internet. Each player selects an "Avatar" which is often a three-dimensional representation of a person or other object to represent them in the virtual environment. Participants send commands to a virtual environment server that controls the virtual environment to cause their Avatars to move within the virtual environment. In this way, the participants are able to cause their Avatars to interact with other Avatars and other objects in the virtual environment.

A virtual environment often takes the form of a virtual-reality three dimensional map, and may include rooms, outdoor areas, and other representations of environments commonly experienced in the physical world. The virtual environment may also include multiple objects, people, animals, robots, Avatars, robot Avatars, spatial elements, and objects/environments that allow Avatars to participate in activities. Participants establish a presence in the virtual environment via a virtual environment client on their computer, through which they can create an Avatar and then cause the Avatar to "live" within the virtual environment.

As the Avatar moves within the virtual environment, the view experienced by the Avatar changes according to where the Avatar is located within the virtual environment. The view that is displayed to the user is the Avatar's view into the virtual environment so that the user controlling the Avatar may see what the Avatar is seeing.

The participant may control the Avatar using conventional input devices, such as a computer mouse and keyboard. The inputs are sent to the virtual environment client which forwards the commands to one or more virtual environment servers that are controlling the virtual environment and providing a representation of the virtual environment to the participant via a display associated with the participant's computer.

Depending on how the virtual environment is set up, an Avatar may be able to observe the environment and optionally also interact with other Avatars, modeled objects within the virtual environment, robotic objects within the virtual environment, or the environment itself (i.e. an Avatar may be allowed to go for a swim in a lake or river in the virtual environment). In these cases, client control input may be permitted to cause changes in the modeled objects, such as moving other objects, opening doors, and so forth, which optionally may then be experienced by other Avatars within the virtual environment.

"Interaction" by an Avatar with another modeled object in a virtual environment means that the virtual environment server simulates an interaction in the modeled environment, in response to receiving client control input for the Avatar. Interactions by one Avatar with any other Avatar, object, the environment or automated or robotic Avatars may, in some cases, result in outcomes that may affect or otherwise be observed or experienced by other Avatars, objects, the environment, and automated or robotic Avatars within the virtual environment.

A virtual environment may be created for the user, but more commonly the virtual environment may be persistent, in which it continues to exist and be supported by the virtual environment server even when the user is not interacting with the virtual environment. Thus, where there is more than one user of a virtual environment, the environment may continue to evolve when a user is not logged in, such that the next time the user enters the virtual environment it may be changed from what it looked like the previous time.

Virtual environments are commonly used in on-line gaming, such as for example in online role playing games where users assume the role of a character and take control over most of that character's actions. In addition to games, virtual environments are also being used to simulate real life environments to provide an interface between users that will enable on-line education, training, shopping, business collaboration, and other types of interactions between groups of users and between businesses and users.

As Avatars move within the virtual environment, they will be presented with a two or three dimensional view of the environment. According to an embodiment of the invention, the place where the user focuses attention within the virtual environment may be tracked. Areas that attract larger amounts of user attention may be found in this way to determine natural locations for placement of advertisement within the virtual environment. When a user encounters a graphical object such as an advertisement, web page, graphical user interface, or other visual item, the user's attention on the object may be tracked and used to determine which aspect of the graphic object is found to be interesting to users of the virtual environment. This enables a direct measurement of the user's perception to be obtained so that people who design graphic objects are able to obtain feedback on the graphic object design. The monitoring may also be used to determine the user's perception of physical objects and the three dimensional virtual environment itself.

As used herein, the term "graphic object" will be used to refer to a visual object that is created for a particular purpose other than to define a volume within the virtual environment. The graphic object may be rendered as a texture on a surface in the virtual environment or otherwise included in the virtual environment. Examples of graphic objects include advertisements, application graphic user interfaces, web page design, art, and other types of visually perceptible objects. Graphic objects may be still content, may include motion video, and may include a mixture of still and moving elements. Users' interaction with the graphic object enables the designer of the graphic object to know which portions of the graphic object are attracting attention.

In addition to graphic objects, three dimensional objects representing products may be included in the virtual environment. For example, a laptop computer may be modeled and included in the virtual environment. Similarly, chairs, tables, and other products may be included in the virtual environment. Any type of product may be placed in the virtual environment for testing using this process. The user's focus on those three dimensional objects may be monitored to determine which aspects of the three dimensional object are attracting the users' attention.

FIG. 1 shows a portion of an example system 10 that may enable user feedback to be obtained from interaction between the user and a three dimensional computer generated virtual environment. As shown in FIG. 1, a user 12 may access the virtual environment 14 from their computer 22 over a packet network 16 or other common communication infrastructure. The virtual environment 14 is implemented by one or more virtual environment servers 18. Communication sessions between the users 12 may be implemented by one or more communication servers 20. As users move about within the virtual environment, the user's attention may be monitored by user attention tracking function which may be implemented by the virtual environment servers 18 or implemented via a separate user attention tracking server 19.

The virtual environment may be implemented as using one or more instances, each of which may be hosted by one or more virtual environment servers. Conventionally, each instance of the virtual environment may be referred to as a separate World. Avatars in a given world are allowed to communicate with other users that also have Avatars in the same world over a communication session hosted by the communication server 20. Generally, a virtual environment will have its own distinct three dimensional coordinate space. Where there are multiple worlds, user attention information may be maintained separate for each world or, alternatively, if the worlds are the same, then the user attention information may be consolidated between worlds.

Figure 2:
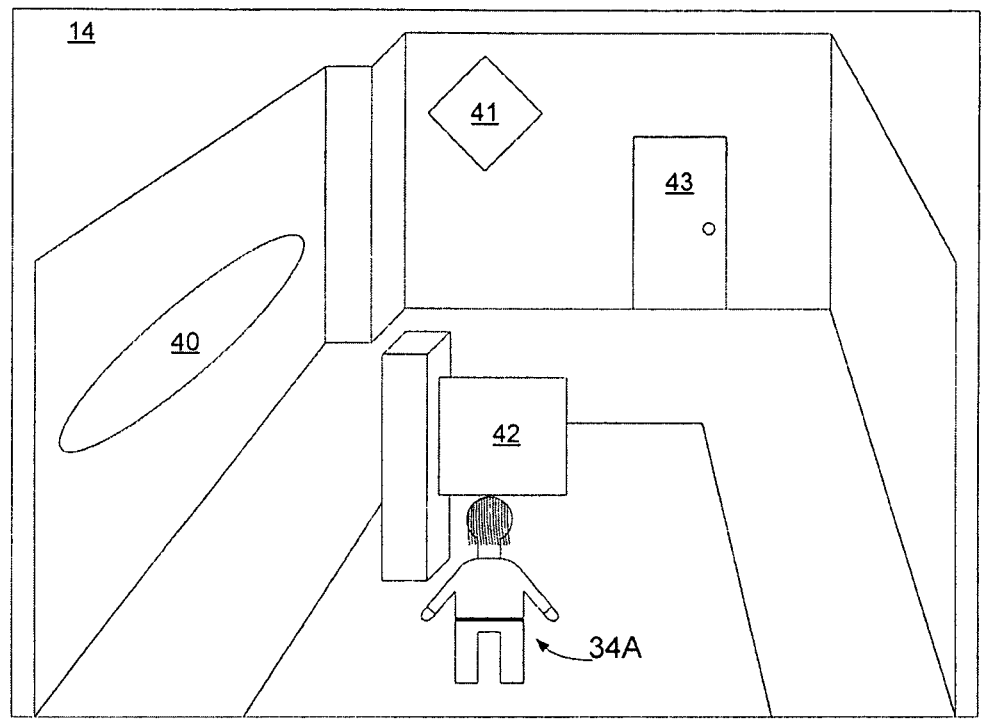
FIGS. 2-8 show examples of how an Avatar's actions within a computer generated virtual environment may be used to track user attention according to embodiments of the invention.
Figure 3:
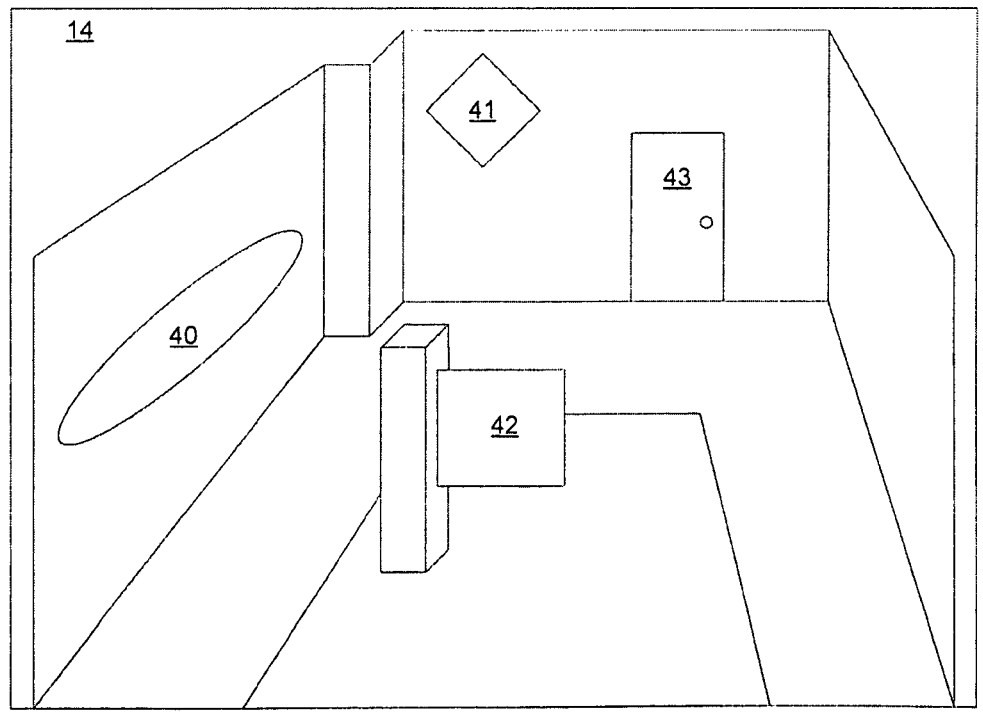

Avatars representing users may move within the three dimensional coordinate space and interact with objects and other Avatars within the three dimensional coordinate space. The virtual environment servers maintain the virtual environment and generate a visual presentation for each user based on the location of the user's Avatar within the virtual environment. The view may also depend on the direction in which the Avatar is facing and the selected viewing option, such as whether the user has opted to have the view appear as if the user was looking through the eyes of the Avatar, or whether the user has opted to pan back from the Avatar to see a three dimensional view of where the Avatar is located and what the Avatar is doing in the three dimensional computer-generated virtual environment. FIG. 2, for example, shows a toggled view which may be presented to the user to show how the Avatar appears in the example virtual environment. FIG. 3, by contrast, shows what the Avatar is seeing in the virtual environment.

Each user 12 has a computer 22 that may be used to access the three-dimensional computer-generated virtual environment. The computer 22 will run a virtual environment client 24 and a user interface 26 to the virtual environment. The user interface 26 may be part of the virtual environment client 24 or implemented as a separate process. A separate virtual environment client may be required for each virtual environment that the user would like to access, although a particular virtual environment client may be designed to interface with multiple virtual environment servers. A communication client 28 is provided to enable the user to communicate with other users who are also participating in the three dimensional computer-generated virtual environment. The communication client may be part of the virtual environment client 24, the user interface 26, or may be a separate process running on the computer 22.

Although particular modules and pieces of software are described in connection with the user computer of FIG. 1 as performing various, the invention is not limited to this particular embodiment as many different ways of allocation functionality between components of a computer system may be implemented. Additionally, the manner in which the functionality is split between the virtual environment server and the virtual environment client may be adjusted as well. Thus, the particular implementation will depend on the particular programming techniques and software architecture selected for its implementation and the invention is not intended to be limited to the one illustrated architecture.

The user may see a representation of a portion of the three dimensional computer-generated virtual environment on a display/audio 30 and input commands via a user input device 32 such as a mouse, touch pad, or keyboard. The display/audio 30 may be used by the user to transmit/receive audio information while engaged in the virtual environment. For example, the display/audio 30 may be a display screen having a speaker and a microphone. The user interface generates the output shown on the display under the control of the virtual environment client, and receives the input from the user and passes the user input to the virtual environment client. The virtual environment client passes the user input to the virtual environment server which causes the user's Avatar 34 or other object under the control of the user to execute the desired action in the virtual environment. Thus, the user may control a portion of the virtual environment, such as the person's Avatar or other objects in contact with the Avatar, to change the virtual environment for the other users of the virtual environment.

Typically, an Avatar is a three dimensional rendering of a person or other creature that represents the user in the virtual environment. The user selects the way that their Avatar looks when creating a profile for the virtual environment and then can control the movement of the Avatar in the virtual environment such as by causing the Avatar to walk, run, wave, talk, or make other similar movements. Thus, the block 34 representing the Avatar in the virtual environment 14, is not intended to show how an Avatar would be expected to appear in a virtual environment. Rather, the actual appearance of the Avatar is immaterial since the actual appearance of each user's Avatar may be expected to be somewhat different and customized according to the preferences of that user and the options of the virtual environment. Since the actual appearance of the Avatars in the three dimensional computer-generated virtual environment is not important to the concepts discussed herein, Avatars have generally been represented herein using simple geometric shapes or two dimensional drawings, rather than complex three dimensional shapes such as people and animals.

The virtual environment server may insert advertising content into the virtual environment to enable the advertisements to be presented to the users of the virtual environment. The advertisement may be a static print advertising, such as would appear on a virtual billboard, full motion video, or other types of advertising. Audio may be implemented as well. Other types of advertisement may be used as well, such as product placement.

Advertisements selected to be presented to a particular user may depend on the user's profile, the user's demonstrated proclivities as interpreted by the user's past on-line behavior, and other information that the virtual environment server may discern about the user. For example, where the user is accessing the virtual environment through a virtual environment client instantiated in a Web browser, the web browser's history file may be used and analyzed to determine what topics and brands may be of interest to the user. This information may then be used by the virtual environment server to select ads for presentation to the user in the virtual environment. Similarly, advertisements may be controlled to match the possible interests of the users, to comply with any applicable legal restrictions, and as otherwise desired by the person sponsoring the graphic object.

Although dynamic advertisement selection may be used in the virtual environment to select advertisements for presentation to a user, other ways of selecting advertisements may be used as well. For example, the owner of the virtual environment may sell static advertising space. In this embodiment, the particular space in the virtual environment will be attributed with the advertising such that any Avatar that comes within visual distance and/or audio distance of the advertisement will be provided with a video and/or audio presentation of the advertisement.

According to an embodiment, the user's attention and other interaction with advertisements or sponsored products is monitored to determine whether the advertisement/product is viewed, if so what aspects are viewed, how long they are viewed and other aspects about how the user is looking at the graphic or physical object. The user's perception of the advertisement/object enables the user's reaction to be gauged to obtain feedback about the effectiveness and design of the object. The user's attention may also be used to provide feedback on the overall design of the virtual environment and, hence, may enable the virtual environment design to be optimized so that navigation and interaction with the virtual environment may be improved.

FIG. 2 shows an example three dimensional computer generated virtual environment 14. As shown in FIG. 2, the three dimensional computer-generated virtual environment contains a representation of a virtual world. Avatars may walk around within the virtual environment or take other actions in the virtual world. In the example shown in FIG. 2, there are four advertisement regions that have been designated to contain advertising—an oval 40, a diamond 41, a square 42, and a rectangle 43. The four places may have functions in the virtual environment. For example, the oval 40 and square may be areas designed to convey directions or other information to users of the virtual environment, such as a sign hanging on a post 44. The diamond 41 may be a window on a building, and the rectangle 43 may be a movable object such as a door. These are merely examples of types of areas within the virtual environment that may be selected to contain advertising. Since virtual environments may contain myriad shapes, textures, levels, etc., the simplistic line drawing of FIG. 2 is not intended to be exhaustive but rather is merely intended to show conceptually how advertising may be placed in an example virtual environment.

As the user interacts with the virtual environment, the user will cause their Avatar to move within the virtual environment. This interaction may be tracked in relation to the known placement of the advertisement within the virtual environment to determine how the user is interacting with the particular advertisement content and, hence, the user's impression of the content. Additionally, the other places that the user focuses on in the virtual environment may be tracked as well, to identify potential additional advertising locations. As the user focuses on particular aspects of the graphic object, the user's attention may be tracked to determine how the users are perceiving the graphic object. As described below, the Avatar's focal point may be used as a proxy for the user's focal point, and a statistical distribution function may be applied about the Avatar's focal point to provide a statistical determination of where the user is likely to be looking.

FIG. 2 shows an Avatar 34A standing in front of the square advertisement region. The user is standing directly in front of this advertisement region and, accordingly, it may be interpreted that the user is reading the content of the advertisement. Thus, as shown in FIG. 2, the Avatar's position in the virtual environment may be monitored relative to the advertisement regions to determine whether the user has perceived the content contained in the advertisement region.

FIG. 2 shows the virtual environment from a third person perspective, rather than from a first person view. In operation, it is easier to track user perception from a first person view. An example of this is provided in FIG. 3, which shows the Avatar 34A standing in front of the rectangular advertisement region. When a person is using the virtual environment client to show a first person point of view, the center of the user's screen is generally coincident with the focal point of the Avatar's vision. Since users tend to look at the center of their screen, it is statistically more probable that the user is looking where the Avatar is looking than that the user is looking at a different area of the screen. Objects that are farther from the Avatar's focal point are statistically less likely to be focused on by the user. By tracking where the Avatar is focused, it is thus possible to infer what aspect of the virtual environment the user is looking at. Additionally, when the user is focused on an object, such as a graphic object or physical object, the user's attention on the object may be monitored to determine how users are perceiving the object in the virtual environment.

As the avatar moves about, the avatar will look at different facets of the virtual environment, which will be shown to the user. Based on what the Avatar is looking at, it is possible to infer the user's interest in a particular graphic object, aspect of a graphic object, or other feature. Where the graphic object is an advertisement, the user's perception of the features of the advertisement may be tracked. This enables the designer of the advertisement to learn whether users are focusing primarily on the artwork, the tag line, or other features of the advertisement. For example, if users always look at the artwork and never look at the description of the product or the company logo, the advertisement may be less effective at creating brand awareness for the product. Similarly, if the users are presented with a web site design, tracking the way that users look for information on the site can help the web site designer learn whether users are finding the particular arrangement of information confusing or intuitive.

As indicated above, there are areas of the virtual environment that may have more than one purpose. For example, the rectangular advertisement region serves as both a door and as an advertisement region. The user's presence in front of the door, therefore, may not automatically be interpreted as an indication that the user has focused on the advertisement content. However, if the user moves in front of the door, pauses, and then continues on to a different portion of the virtual environment, that may be a compelling indication that the user paused to review the content of the advertising contained in the rectangular advertisement region. Accordingly, the user's action within the virtual environment, as well as the user's position in the virtual environment, may be used to determine whether the user has viewed an advertisement. When the user is idle, however, the periods of inactivity may be screened to prevent false feedback from being generated during the idle period. Similarly, while the user is chatting in a chat box, it may be assumed that the user is focused on the chat box and, hence, typing in a chat box may be treated as a period of inactivity.

Figure 4:
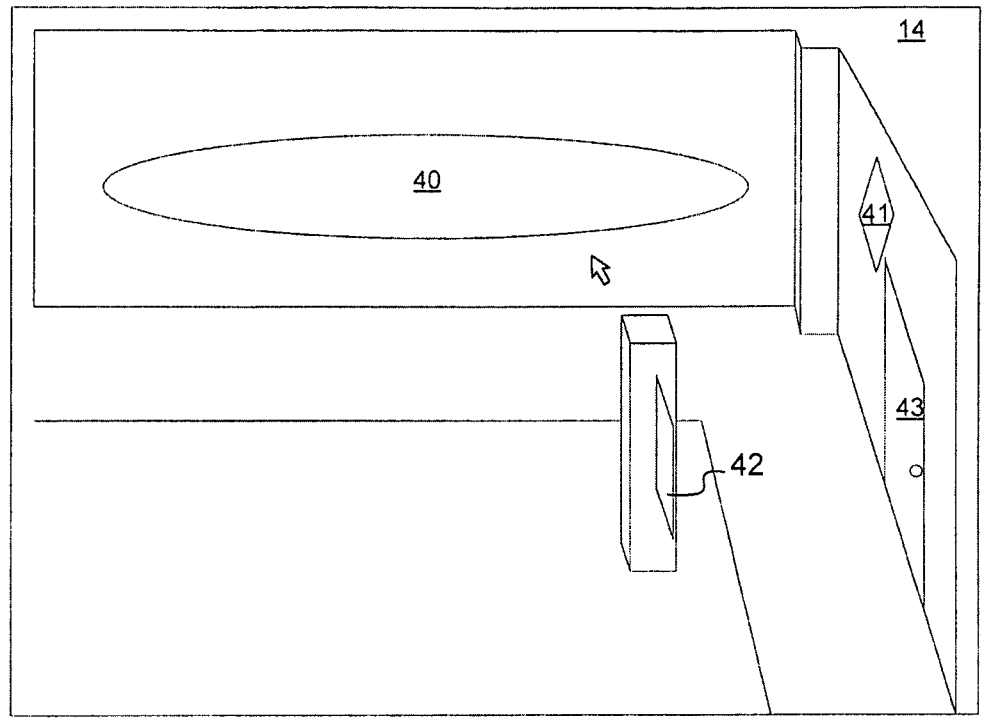
Figure 5:
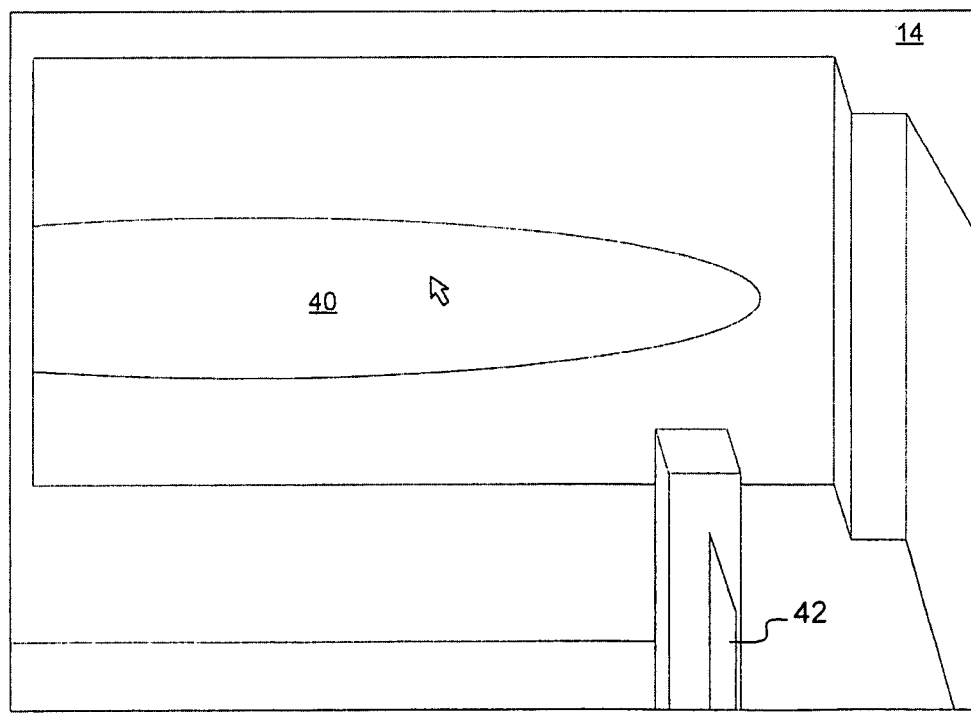

FIGS. 4 and 5 show the Avatar interacting with the oval shaped advertisement region. As seen in FIGS. 4 and 5, as the Avatar turns within the virtual environment to face the direction of the oval-shaped advertisement region, the user's perspective into the virtual environment will change so that the user has a view in the new direction. Accordingly, the Avatar's orientation and focus within the virtual environment may be used to determine what aspect of the virtual environment the user is focused on at any point in time.

Users naturally move items of interest toward the center of their display to look at them. Particularly with a large object, people tend to put the object on which they are focused in a region close to the center of the screen. This enables the user to view the object in context while focusing on the particular aspect of the object of interest. Accordingly, the aspect of the graphic object that is closer to the center of the user's screen may be assumed to be the portion of the graphic object that is of primary interest to the user.

In a virtual environment, when viewing the virtual environment in first person mode, the focal point of the Avatar's vision corresponds to the center of the user's screen. Accordingly, by tracking the Avatar's focal point in the virtual environment, it is possible to track where the user is likely to have focused while the user interacted within the virtual environment.

Since the Avatar's focal point is not guaranteed to be precisely where the user is looking, a statistical function is applied to enable an attention monitoring function to statistically determine where the user is likely to have been looking. In essence, the attention monitoring function will track the Avatar's focal point and make an assumption that there is an x % chance that the user was focused directly at the Avatar's focal point. The user could have looked elsewhere as well and, accordingly, there is a statistical chance that the user was looking slightly to the left/right, up/down, etc. The statistical likelihood decreases with distance from the Avatar's focal point. Accordingly, the attention monitoring function will apply a statistic map to show where, statistically, the user's attention is likely to have been while the user interacted with a particular part of the virtual environment.

Figure 12:
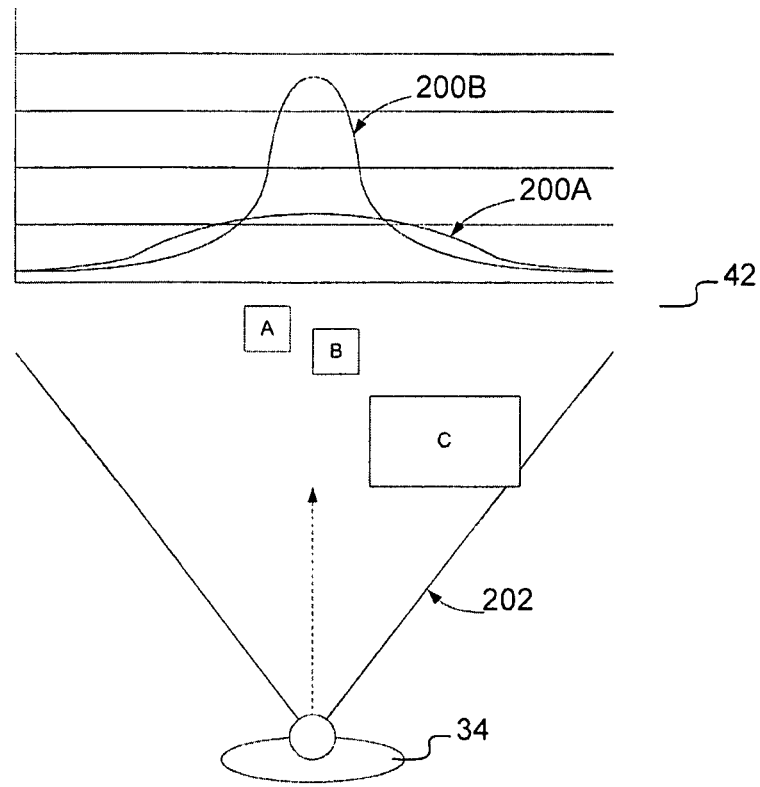
FIGS. 12-15 show conceptually how the system may determine the user's focal point in the virtual environment.

FIG. 12 shows a two dimensional statistic map implemented using a probability density function 200 which shows the user's attention across the avatar's field of view 202. The Avatar 34 will have a field of view that is limited in scope as indicated by the left and right side lines. An object that is outside of the Avatar's field of view is not visible to the Avatar and, hence, the probability density function falls to zero outside the field of view since the user cannot be focusing on an object that is outside the Avatar's field of view. The center of the Avatar's field of view 204 is indicated by a dashed line.

The particular probability density function may be relatively focused, as shown by line 202A, or may be more flat and less well defined, as shown by line 202B. The shape of the probability density function may be selected based on the designer's perception of how the users interact with the virtual environment. A more focused probability density function 200A will give a more precise map of where the center of the user's attention is. For example, as shown in FIG. 12, if the probability density function has a high variance (steep normal curve 200A) it is possible to say with some precision that the user is focused on either object A or B, and not likely to be focused on object C. If there is a lower density, such as the shallow normal curve, it is hard to tell for this particular user if they are paying attention to object A, B, or C.

As the user moves through the virtual environment, the user's attention will be used to control a virtual brush to paint the three dimensional space. The amount of color applied by the virtual brush may follow the profile density function selected for monitoring the users' attention. As multiple users use the virtual environment, the virtual brush strokes applied by each Avatar as it progresses through the virtual environment can create a thermal overlay on the three-dimensional space that may be viewed to determine what users are looking at in the virtual environment.

The virtual brush does not actually color the virtual environment for other users, but rather the coloration applied by the virtual brush is collected by the attention monitoring function for later analysis. Thus, to a particular user, the fact that their attention is being monitored will not affect the Avatar's actions within the virtual environment and similarly will not affect the user's perception of the virtual environment. Rather, this process is running in the background collecting data about the user's attention in the virtual environment.

Figure 13:
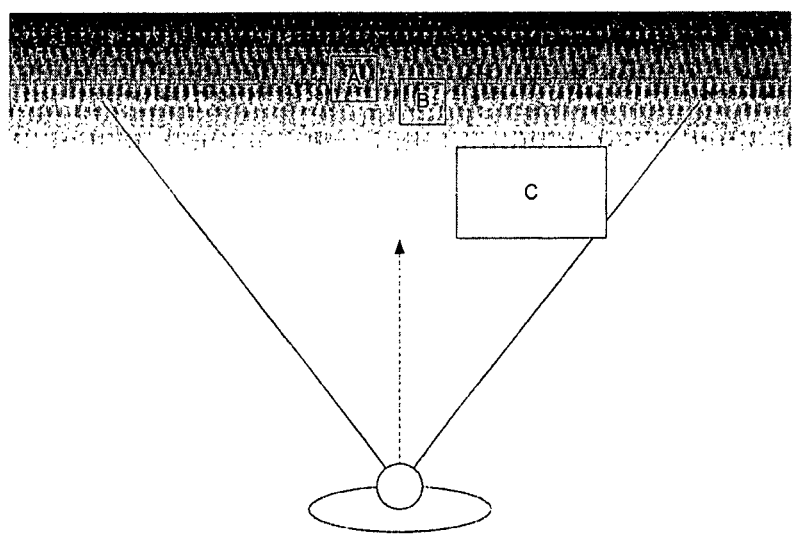

To increase the accuracy with which the user's attention may be tracked, various physical aspects of the virtual environment may be taken into account. For example, a virtual environment may have distance fog or depth of field blur as shown in FIG. 13. Thus, some objects which are within the user's field of view may be blurred out and, hence, not likely to be clearly visible to the user. Accordingly, even if the object is directly in the middle of the user's field of view, it is not likely that the user is focused on those objects. Thus, these objects would not be painted with the virtual brush to enable the attention monitoring system to account for the depth of view blurring. The sharpness of the probability density function may be decreased with distance from the Avatar since the user is less likely to be focused on a particular item when there is a relatively deep field of view.

Figure 14:
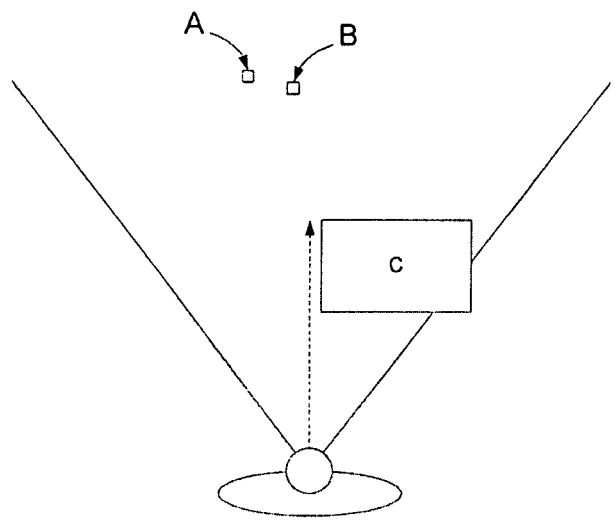

FIG. 14 shows a similar phenomenon. In this example, objects A and B are too far away to be clearly seen by the user. Specifically, even though the virtual environment has not applied distance fog/depth of field blur, the object itself would be rendered on the user's display with such a small number of pixels that it is very unlikely that the user is actually looking at those objects. Accordingly, the attention monitoring system will apply a low probability to those objects even if the user is focused directly toward them. Rather, as shown in FIG. 14, between the two distant objects and the somewhat peripherally located object C, it is more likely that the user is looking at object C than one of the distant objects. Thus, the distant objects or details of the distant objects may be eliminated from the set of objects the user might be looking at.

Figure 15:
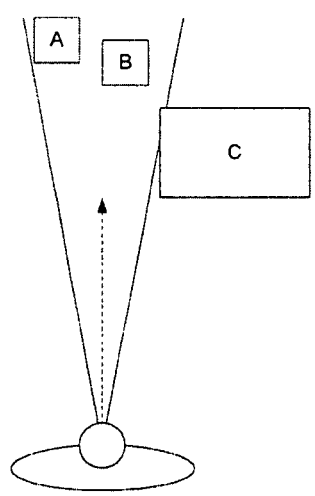

FIG. 15 shows another way in which the set of objects may be restricted to get a more accurate estimation of the user's focus in the virtual environment. Specifically, as shown in FIG. 15 when the user narrows his field of view to look more closely at a particular object, then objects outside the user's new field of view are assumed to no longer be candidates of the user's attention.

The data collected by the attention monitoring system is statistical in nature, since the user's focus is not actually monitored. Rather, the attention of the user's Avatar is monitored. The Avatar's focus is a known attribute of the Avatar and, hence, can be tracked easily and accurately. To convert the Avatar's focal point into statistical information relating to the likely location of the user's attention, a probability density function is applied centered on the Avatar's focal point. Then, additional knowledge of the virtual environment is used to refine the statistical data by attempting to determine what the user could possibly be focused on.

Figure 9:
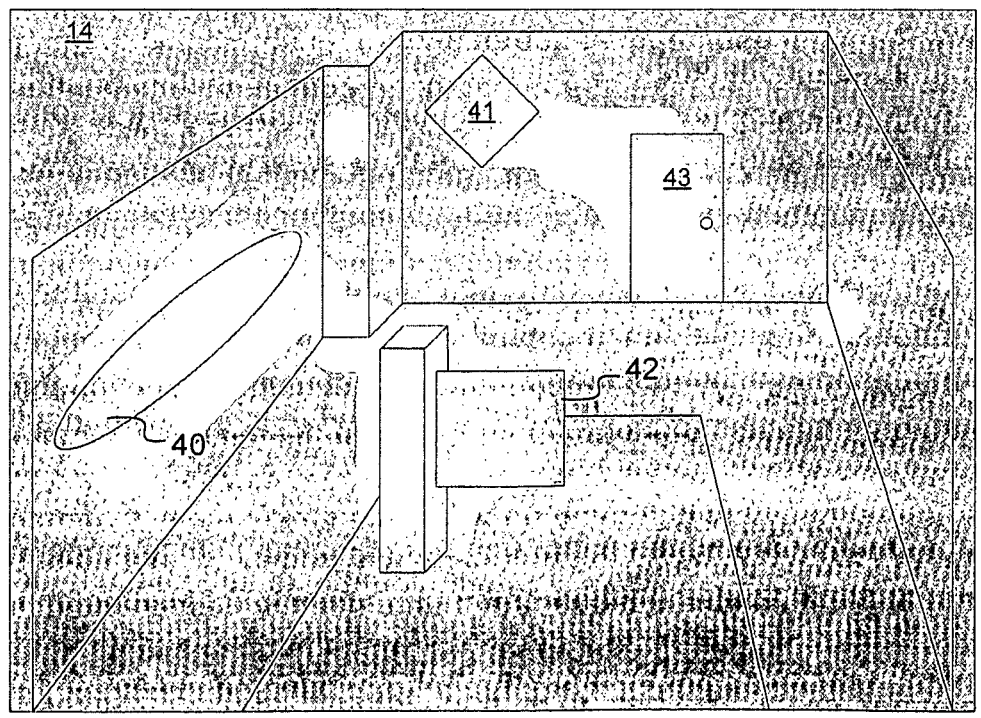
FIGS. 9-11 show examples of how attention tracking results may be summarized for presentation to a person interested in tracking user attention according to an embodiment of the invention.

By collecting statistical data from multiple users, a map of users' attention in the virtual environment may be created to show the designer or other person which aspects of the virtual environment, graphical object, or three dimensional object, are being focused on by users of the virtual environment. The map may be presented in the form of a heat map as shown in FIG. 9 or using another mechanism to provide feedback related to the virtual environment, graphical object, or three dimensional object.

Referring back to FIGS. 4-5, the closer an Avatar gets to an advertisement region the more strongly the user may be assumed to be reading and understanding what is shown in any advertisement contained in the advertisement region. For example, as shown in FIGS. 4 and 5, when the user is farther away from the advertisement region a lesser correlation may be assumed between the user and the content of the advertisement. However, as the user gets closer to the advertisement, the user's perception of the advertisement may increase since the content of the advertisement will become larger and more focused.

An Avatar's vision, i.e. where the Avatar is looking in the virtual environment, may be controlled by a mouse pointer 44 or by another control. According to an embodiment, the particular point where the Avatar is looking may be tracked as the Avatar negotiates the virtual environment. The place in the Virtual Environment where the Avatar is looking will be referred to herein as the "focal point". When the Avatar's focal point is not on an advertisement area, the focal point will be tracked to see what aspect of the virtual environment attracts peoples' attention in that particular area. Locations that attract a lot of attention may be good candidates for inclusion of new advertising regions into the virtual environment. For example, if 80% of the users that enter an area look at a particular pole, the pole may be a good place to put up an advertising region. If, by contrast, only 2% of the people that enter the region look at the pole, adding an advertising region to the pole may be less than ideal since it is not a natural place for people to focus when interacting with that area of the virtual environment.

Similarly, when the Avatar's focal point is on an advertisement area, the uses' attention within the advertisement may be tracked to see what features or portions of the advertisement attracts the most attention. Thus, for example, if the advertisement contained the company logo and slogan in the upper left corner, a graphic in the main body of the advertisement, and text in the lower center, the user's focus on one aspect or the other may help determine the effectiveness of each of these portions of the advertisement. Advertising designers can take this feedback as to how people are perceiving their advertisement to determine the likely effectiveness of each of the elements of the advertisement.

Figure 6:
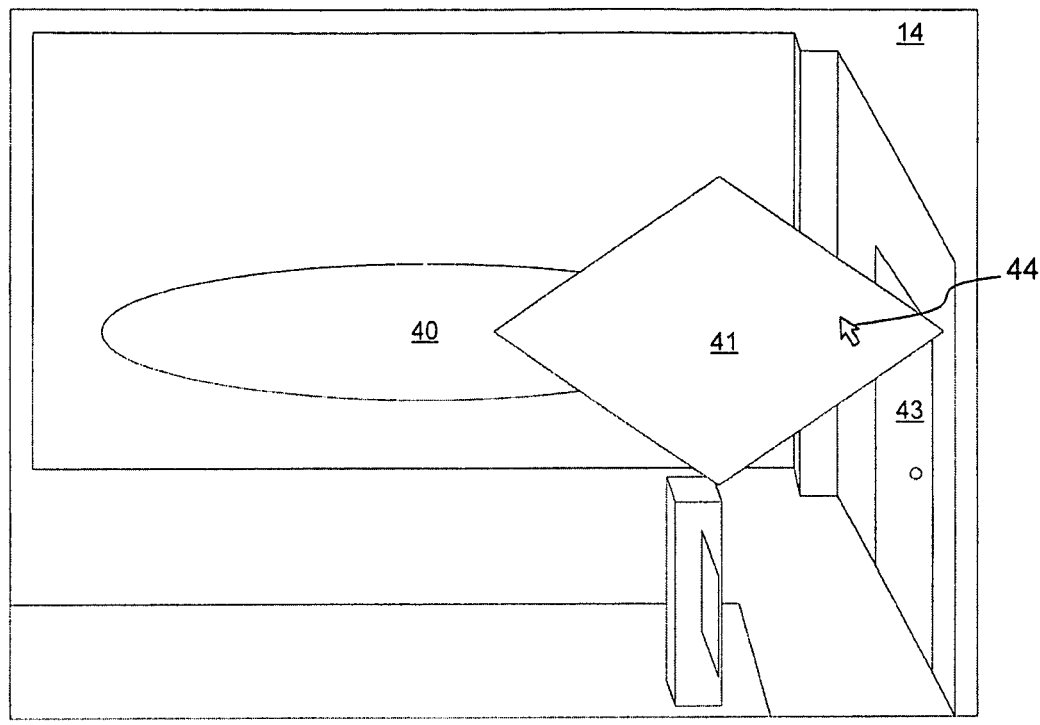
Figure 7:
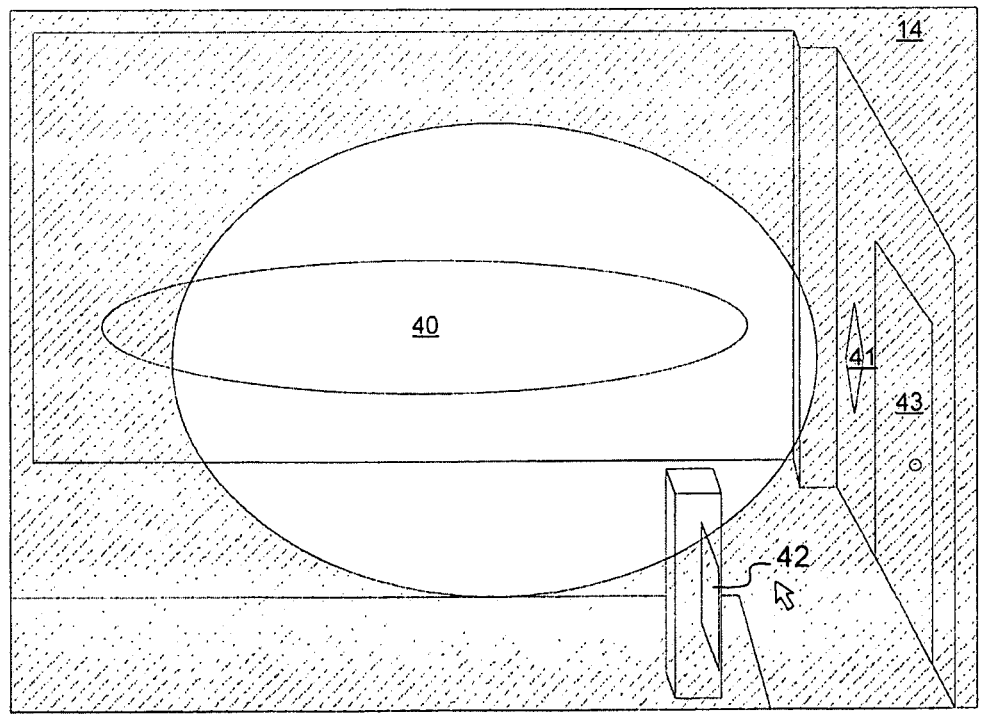
Figure 8:
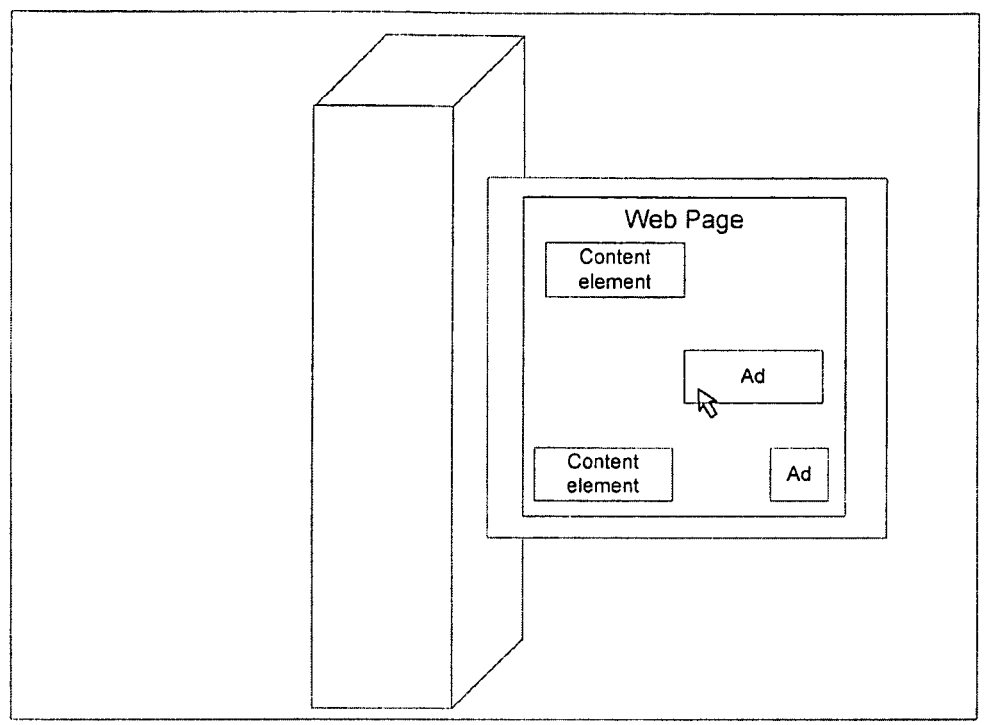

FIGS. 6 and 7 show several additional features that may be implemented in connection with tracking the user's visual use of the virtual environment. In the embodiment shown in FIG. 6, when the user dwells on a particular advertisement for a sufficient period of time, such as two seconds, and is relatively far away, the size of the advertisement may be increased to provide the user with a better view of the advertisement. This enables the user to have tunnel vision toward the advertisement to provide the user with a clearer view of the advertisement that is contained within the advertising region. This may be implemented with other graphic objects in the virtual environment as well, and is not limited to advertisements. For example, if a portion of the virtual environment contains a video display, presentation, or other presentation, causing the Avatar to focus on the graphic object for a period of time may cause an enlarged version to be presented to the user for a clearer view of the content of the graphic object.

FIG. 7 shows a similar embodiment in which the user's field of view is narrowed by blurring regions outside the primary focus of the field of view. This enables the user to focus on a particular region in the virtual environment to help the user to focus on the graphic object.

It is common for a user to use a mouse to control a cursor when interacting with various computer programs, including virtual environments. Although not guaranteed, when a user is moving their mouse to move their pointer, a strong assumption may be made that their eyes are focused on the cursor or the portion of the screen immediately surrounding the cursor. For example, as shown in FIG. 9, the user has moved their cursor over an Advertisement. Although the advertisement is not precisely in the center of the field of view, it is statistically more likely that the user has focused on the advertisement at least briefly while in this portion of the virtual environment. When the cursor is not being moved, the user's attention is likely not focused on the cursor since the user is more likely to be focused on other aspects of the screen at that point in time. Accordingly, cursor movement may be used to adjust the statistical measurement of the user's focus within the virtual environment as well.

As described in connection with FIGS. 2-7, there are many different aspects that may be used to determine what the user is looking at in the virtual environment. For example, the user's position in the virtual environment, orientation in the virtual environment, distance from particular advertising regions, Avatar movement relative to the advertisement regions, cursor location and movement, and viewpoint, all may be used and tracked to determine the user's perception of particular graphic objects within the virtual environment.

Optionally, the user's audio may be monitored while in the vicinity of the advertisement to determine whether the user has mentioned the advertisement. For example, key words may be associated with an advertisement to determine whether a user is discussing the advertisement with other users of the virtual environment. The fact that the advertisement is being discussed may also be used as an indication of the effectiveness of the advertisement. If appropriate permission is obtained, a snippet of the conversation or key words may be recorded to enable the comments to be analyzed at a later point in time.

Once the raw data relating to the user's perception of particular advertising content has been collected, it may be analyzed to provide feedback about the graphic object. For example, the feedback may help an Advertiser determine the effectiveness of an advertisement. Similarly, the number of users that view a given advertisement may be used to determine how much money the advertiser should pay for use of the advertising space in the virtual environment. Persons skilled in developing advertisements and interpreting eye tracking and physical response sensors may analyze the data in many different ways and the invention is not limited to a particular manner in which the data is interpreted.

Data will be collected from multiple users of the virtual environment. The data may be summarized to obtain statistical results associated with how objects are being perceived by users of the virtual environment. The statistical results may be based on a particular object at a particular location, or may be obtained by aggregating results from multiple instances of the same object that has been placed at different locations/instances of the virtual environment.

FIG. 9 shows an example of a heat map that may be generated based on the statistical user attention records collected by the attention monitoring function. As shown in FIG. 9, the attention monitoring function can use the virtual brush to color the environment. Each user that interacts with the virtual environment can be monitored to similarly color the virtual environment. The combination of all of the brush strokes can paint the three dimensional surfaces of the virtual environment. When a user walks through the virtual environment, as painted by the attention monitoring function, the areas that are highly viewed will appear in a different color than areas that are less highly viewed by users. Although FIG. 9 shows a virtual environment, the same type of map may be created for three dimensional objects. However, rather than overlay a heat map onto a flat surface, the actual three dimensional surface may be colored so that a person using the attention monitoring function can turn the object over and around to see what aspects/features of the object attracted the most attention. In the example shown in FIG. 9, people tended to focus primarily on the oval 40, and then secondarily on the square 42. The triangle window and door also attracted a lot of attention. For some reason, two other random areas also attracted a lot of attention.

Figure 10:
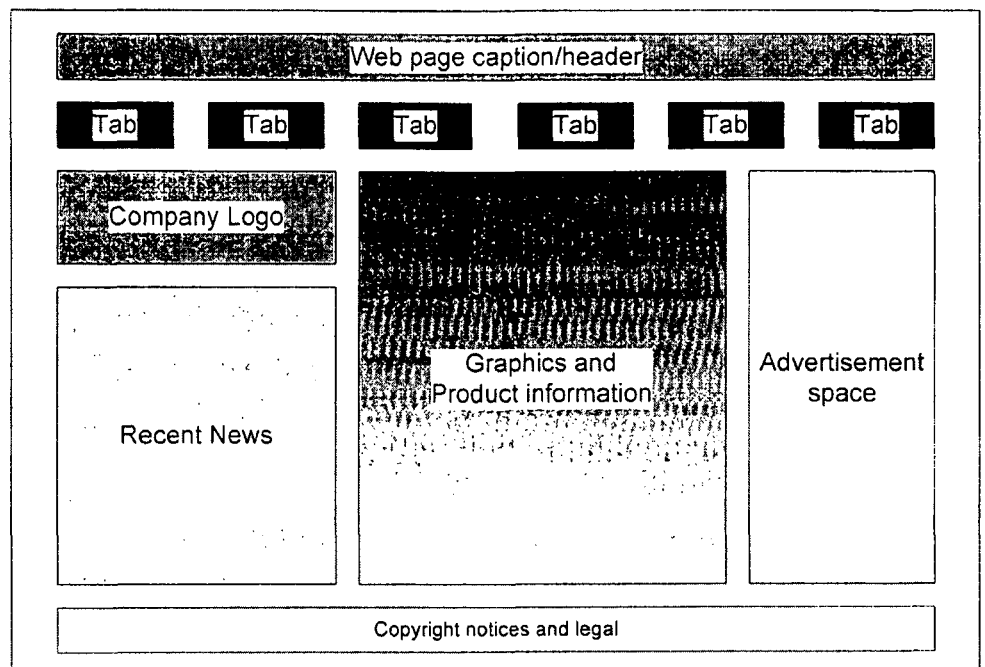

FIG. 10 shows an example web page and shows how people tended to view the web page. As shown in FIG. 10, people tended to focus primarily on the top of the web page, on the tabs containing links to other aspects of content available through the page. Fewer people focused on the lower half of the web page. This may help the web site designer determine that inclusion of critical information on the lower half of the web page is probably not ideal. Alternatively, the designer may determine that it would be good to have an attention grabbing graphic on the lower portion of the page to direct some of the user' attention toward that area of the web page.

Figure 11:
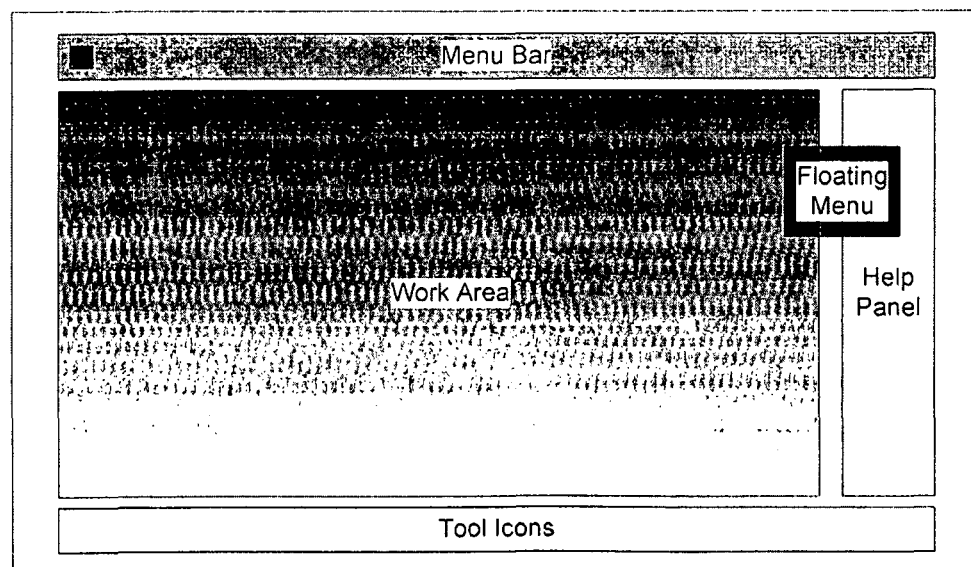

FIG. 11 shows an example user interface for an application that may be provided in an advertising area to obtain user feedback on the graphic user interface. As shown in FIG. 11, users tended to look at the menu bar and top of the work area, with particular attention paid to particular icons in the menu bar. A floating menu also attracted particular attention. Less attention was paid to the tool icons on the bottom of the screen and to the help panel on the right hand side.

Although particular ways of presenting statistical results have been shown in connection with FIGS. 9-11, other ways of summarizing the user' interactions with graphical objects may be provided as well. Accordingly, different tools may be used to provide feedback as to where users tend to focus within the virtual environment and, when focused on a graphic object, what aspects of the graphic object are of particular interest to users.

The functions described above may be implemented as one or more sets of program instructions that are stored in a computer readable memory and executed on one or more processors within on one or more computers. However, it will be apparent to a skilled artisan that all logic described herein can be embodied using discrete components, integrated circuitry such as an Application Specific Integrated Circuit (ASIC), programmable logic used in conjunction with a programmable logic device such as a Field Programmable Gate Array (FPGA) or microprocessor, a state machine, or any other device including any combination thereof. Programmable logic can be fixed temporarily or permanently in a tangible medium such as a memory chip, computer memory, memory stick, disk, or other storage medium. All such embodiments are intended to fall within the scope of the present invention.

It should be understood that various changes and modifications of the embodiments shown in the drawings and described in the specification may be made within the spirit and scope of the present invention. Accordingly, it is intended that all matter contained in the above description and shown in the accompanying drawings be interpreted in an illustrative and not in a limiting sense. The invention is limited only as defined in the following claims and the equivalents thereto.

What is claimed is:

1. A computer-implemented method of evaluating user perception using a virtual environment, the method comprising the steps of:

continuously monitoring an Avatar focal point over time as an Avatar moves within the virtual environment to obtain focal point information associated with the Avatar's interaction in the virtual environment, the Avatar focal point being based on the Avatar's orientation and focus within the virtual environment;

applying a statistical function to the Avatar focal point based on a probability density function centered on the Avatar focal point to create a statistical map containing statistical information related to where the user was likely to have been looking while interacting in the virtual environment, wherein the probability density function includes relatively low to high variance levels based on perception of the avatar; and aggregating the statistical information related to where the user was likely to have been looking with statistical information related to where other users were likely to have been looking while interacting in the virtual environment to determine where users associated with the Avatars are likely to be focused while interacting in the virtual environment, the statistical information related to where other users were likely to have been looking being based on focal point information of other Avatars;

wherein the step of monitoring is performed in connection with a physical object within the virtual environment to determine which aspects of the physical object are focused on by users of the virtual environment to obtain feedback on a design of the physical object by monitoring user interaction with the physical object.

2. The method of claim 1, wherein the statistical map is affected by a size of field of view of the Avatar.

3. The method of claim 1, wherein the statistical map is affected by a depth of the field of view of the Avatar.

4. The method of claim 1, wherein the statistical map is affected by objects in the virtual environment.

5. The method of claim 4, wherein the statistical map is affected by rendered sizes of the objects in the virtual environment.

6. The method of claim 1, wherein the statistical map is affected by a location of a user's mouse cursor.

7. The method of claim 1, wherein statistics are not collected during a period of inactivity.

8. The method of claim 1, wherein the step of monitoring Avatar focal point is performed in connection with the virtual environment to determine which aspects of the virtual environment are focused on by users of the virtual environment.

9. The method of claim 8, wherein the step of monitoring is used to determine locations for advertising content within the virtual environment.

10. The method of claim 8, wherein the step of monitoring is used to optimize navigation and interaction with the virtual environment.

11. The method of claim 8, wherein the step of monitoring is used to count Avatars that view advertisements within the virtual environment.

12. A computer-implemented method of evaluating user perception using a virtual environment, the method comprising the steps of:

monitoring an Avatar focal point as an Avatar moves within the virtual environment to obtain focal point information associated with the Avatar's interaction in the virtual environment, the Avatar focal point being based on the Avatar's orientation and focus within the virtual environment;

applying a statistical function to the Avatar focal point based on a probability density function centered on the Avatar focal point to create statistical information related to where the user was likely to have been looking while interacting in the virtual environment, wherein the probability density function includes relatively low to high variance levels based on perception of the avatar; and aggregating the statistical information related to where the user was likely to have been looking with statistical information related to where other users were likely to have been looking while interacting in the virtual environment to determine where users associated with the Avatars are likely to be focused while interacting in the virtual environment, the statistical information related to where other users were likely to have been looking being based on focal point information of other Avatars;

wherein the step of monitoring is performed in connection with a graphical object within the virtual environment to determine which aspects of the graphical object are focused on by users of the virtual environment to obtain feedback on a design of the graphical object by monitoring user interaction with the graphical object.

13. The method of claim 12, wherein the graphical object is an advertisement.

14. The method of claim 12, wherein the graphical object is a web page.

15. The method of claim 12, wherein the graphical object is a user interface for a software application.

* * * * *